(12) United States Patent
Den Boer (10) Patent No.: US 7,798,500 B2
(45) Date of Patent: Sep. 21, 2010

(54) FOLDABLE STROLLER WITH DETACHABLE CARRIER

(75) Inventor: Jacob Geert Arie Den Boer, Amersfoort (NL)

(73) Assignee: Royalty Bugaboo GmbH, Zug (CH)

( * ) Notice: Subject to any disclaimer, the term of this patent is extended or adjusted under 35 U.S.C. 154(b) by 555 days.

(21) Appl. No.: 11/663,021

(22) PCT Filed: Sep. 16, 2005

(86) PCT No.: PCT/NL2005/000678

§ 371 (c)(1),
(2), (4) Date: Nov. 27, 2007

(87) PCT Pub. No.: WO2006/031115

PCT Pub. Date: Mar. 23, 2006

(65) Prior Publication Data

US 2008/0088116 A1 Apr. 17, 2008

(30) Foreign Application Priority Data

Sep. 16, 2004 (NL) .................................. 1027054

(51) Int. Cl.
*B62B 3/02* (2006.01)
*B62B 7/06* (2006.01)
*B62B 1/04* (2006.01)

(52) U.S. Cl. .................. 280/47.34; 280/47.38; 280/642

(58) Field of Classification Search .............. 280/47.33, 280/47.37, 47.38, 638, 639, 38, 39, 642, 280/643, 647, 648, 650, 47.34, 657, 658; 297/256.16

See application file for complete search history.

(56) References Cited

U.S. PATENT DOCUMENTS

| 4,216,974 A | 8/1980 | Kassai |
| 5,056,805 A * | 10/1991 | Wang ....................... 280/47.36 |
| 6,513,827 B1 * | 2/2003 | Barenbrug ................... 280/648 |
| 2006/0061066 A1 * | 3/2006 | Tan ............................ 280/642 |

FOREIGN PATENT DOCUMENTS

| FR | 2567472 | | 1/1986 |
| GB | 2163478 A | * | 2/1986 |
| WO | 0006437 | | 2/2000 |

* cited by examiner

*Primary Examiner*—Paul N Dickson
*Assistant Examiner*—Chiedu A Chibogu
(74) *Attorney, Agent, or Firm*—The Webb Law Firm

(57) ABSTRACT

A foldable stroller having a frame for supporting a child carrier, wherein the frame includes front and rear wheels, a push/pull handle with a right and left push/pull bar, right and left front and rear wheel bars, having discs, which support the front and rear wheels, respectively, a right and left carrier supporting pin, a right coupling member associated with the right front wheel bar and a left coupling member associated with the left front wheel bar. The right push/pull bar and the right supporting pin are fixed so that the right front and rear wheel bar discs can pivot about an axis that runs transverse to the front and rear wheel bars, the push/pull bars and the support pins. The left push/pull bar and the left supporting pin are fixed so that the left front and rear wheel bar discs pivot relative one another about the pivot axis.

16 Claims, 4 Drawing Sheets

FOLDABLE STROLLER WITH DETACHABLE CARRIER

BACKGROUND OF THE INVENTION

1. Field of the Invention

The present invention relates to a buggy.

2. Description of Related Art

A prior art buggy is disclosed in WO 00/06437. With this known buggy there are, viewed with respect to the direction of travel, rear wheels provided on either side, front wheels provided on either side, front wheel bars provided on either side, rear wheel bars provided on either side as well as a push/pull handle. Each of the wheel bars supports a wheel at one end. The other ends of the wheel bars as well as the free ends of the handle each meet on either side of the frame in a coupling that allows mutual pivoting of the wheel bars. The frame is also provided at each coupling on either side with a supporting pin that at one end is fixed to the respective coupling and projects freely at the other end. In each case a sleeve-shaped member can be slid over each supporting pin. A seat is then fixed between the two sleeve-shaped members. With this buggy, turning the front wheel bars and the rear wheel bars with respect to one another is very practical so as to be able to bring the frame from a stable wheeling position, in which the front wheels and the rear wheels are some distance apart, into a compact folded-up position, in which the front wheels are in between the rear wheels. To prevent the front wheel bars and the rear wheel bars being able to turn with respect to one another when wheeling, in WO 00/06437 the right-hand and the left-hand coupling member can be locked so as to be able to fix the front wheel bars and the rear wheel bars with respect to one another. With this arrangement there are even two locked positions. A first locked position in which the front wheels and rear wheels are spread apart in order to obtain a buggy that is stable when wheeling and another position in which one pair of wheels is between the other pair of wheels (i.e. in the compact position) where a sort of wheelbarrow is then obtained, in which state the buggy can also still be used. Here locking is obtained with a two-part locking mechanism. The one part of the locking mechanism is provided on the buggy frame itself, i.e. on the coupling members thereof. The other part of the locking mechanism is always provided on the seat, and specifically on the sleeves, between which the seat is mounted, to be slid over the supporting pins. The frame-side part of the locking mechanism essentially consists of two discs per coupling member. The one disc supports the rear wheel bars and the other disc supports the front wheel bars. Cut-outs are provided along the surfaces of these discs in contact with one another. What can be achieved by turning the discs is that one cut-out in the one disc is precisely opposite a cut-out in the other disc or that, precisely, one or more cut-outs in the one disc are exactly opposite a portion of the other disc that has no cut-outs. The sleeves on the seat side are each provided with a projection at the bottom thereof. This projection is sized such that it fits precisely in two cut-outs of adjacent discs that are opposite one another, but does not fit in a single cut-out. What can be achieved by now providing said cut-outs in the discs in such a way that in a desired locked position two cut-outs of the adjacent discs are precisely opposite one another below the supporting pin is that locking is possible in that position when a said sleeve is slid over the supporting pin and the projection thereof protrudes into the cut-outs located opposite one another.

SUMMARY OF THE INVENTION

The buggy of the present invention includes a frame on which a carrier for a child, such as a seat, can be placed, wherein the frame comprises:

front and rear wheels;

a push and pull handle with a right-hand push/pull bar and a left-hand push/pull bar;

a right-hand and a left-hand front wheel bar which supports said front wheels;

a right-hand and a left-hand rear wheel bar which supports said rear wheels;

a right-hand and a left-hand supporting pin for supporting the carrier;

a right-hand coupling member to which the right-hand front wheel bar is fixed via a right-hand front wheel bar disc, to which the right-hand rear wheel bar is fixed via a right-hand rear wheel bar disc, and to which the right-hand push/pull bar and the right-hand supporting pin are fixed, in such a way that the right-hand front wheel bar disc and the right-hand rear wheel bar disc can be turned relative to one another about a pivot axis that runs essentially transversely to the front wheel bars, the rear wheel bars, the push/pull bars and the supporting pins;

a left-hand coupling member to which the left-hand front wheel bar is fixed via a left-hand front wheel bar disc, to which the left-hand rear wheel bar is fixed via a left-hand rear wheel bar disc, and to which the left-hand push/pull bar and the left-hand supporting pin are fixed, in such a way that the left-hand front wheel bar disc and the left-hand rear wheel bar disc can be turned relative to one another about the pivot axis;

wherein the right-hand and left-hand coupling member can each be locked in one or more positions in which the right-hand front wheel bar and the right-hand rear wheel bar and, respectively, the left-hand front wheel bar and the left-hand rear wheel bar are fixed relative to one another, and can also be unlocked from these positions.

The aim of the present invention is, now, to provide a buggy, wherein mutual locking of the front wheel bars and rear wheel bars relative to one another can be obtained with high reliability and easily.

Said aim is achieved with a buggy wherein at least one said, and preferably each respective, coupling member, has a locking mechanism provided on the frame, wherein each locking mechanism comprises:

a projection, provided on the respective supporting pin, that, viewed in the transverse direction of the pin and with respect to the pin, can be moved between, on the one hand, a protruding position and, on the other hand, a retracted position;

a pin slider that is provided on the respective supporting pin and can be slid in the longitudinal direction of the respective supporting pin, the pin slider having a first end facing the projection and a second end facing the pivot axis;

a tensioning system equipped to pretension the pin slider and projection such that, while the first end of the pin slider is in contact with the projection, the projection is subjected to a pretensioning force driving it in the direction of the protruding position;

wherein the locking mechanism is equipped to push the pin slider, against the pretensioning force, towards the pivot axis when the projection is pushed in, against the pretensioning force, from the protruding position to the retracted position, such that the locking mechanism moves from a release position corresponding to the protruding position of the projection, in which the respective rear wheel bar disc and the respective front wheel bar disc are able to turn relative to one another, into a locked position corresponding to the retracted position of the projection, in which the respective rear wheel bar disc and the respective front wheel bar disc are not able to turn relative to one another.

It is pointed out that, the term left-hand and right-hand as well as front and rear (in relation to, for example, front wheel bar and rear wheel bar) are relatively arbitrary, specifically depending on the position of the person looking at the buggy. It is important to realise this since, just as in the case of WO 00/06437, the buggy according to the invention can also be either pulled or pushed in the two opposing directions of wheeling; specifically, the push/pull handle can be swung over from the one set of wheels to the other set of wheels. This will also be illustrated in somewhat more detail on the basis of the description of the figures. In this respect the terms left, right, left-hand, right-hand and front and rear are thus interchangeable.

In the case of the buggy according to the invention, the entire locking mechanism for each coupling member is provided on the frame instead of only a part (as in the case of WO 00/06437) that has to interact with another part not provided on the frame in order to be able to form a locking mechanism. In the case of the present invention the entire locking mechanism is provided on the frame. By providing the entire locking mechanism on the frame, the locking mechanism is actuated very easily.

What can be achieved by, in the case of the buggy according to the invention, providing the operating member for the locking mechanism, i.e. the projection, on that part of the frame that is intended to support the child carrier, i.e. the supporting pin, is that operation of the operating member, the projection, is certainly coincident with placing said carrier on the frame. With this arrangement the pin slider forms a very effective transfer of a movement imposed on the projection to a locking movement in or close to the respective coupling member. Mutual fixing of the discs to which, on the one hand, the front wheel bars and, on the other hand, the rear wheel bars are fixed can be achieved in a simple manner by moving the locking mechanism. The locking mechanism will then engage with both discs for locking and will not engage with at least one of these discs for release. Engagement of the locking mechanism with both discs can be achieved, for example, by so constructing the pin slider and providing it on the pin that when this is slid into the locked position the second end of the pin slider, facing the pivot axis, engages in the opposing cut-outs in both discs disclosed in WO 00/06437 (see, for example, the cut-outs with reference numerals 14 and 15 in FIG. 6 of WO 00/06437).

The tensioning system ensures that the locking mechanism according to the invention is pretensioned towards the release position, such that following removal of the operating force on the projection the locking mechanism automatically returns to the release position.

As such, the precise manner in which operation of the projection takes place can be in many different ways. For example, after placing the child carrier on the supporting pin, a ring can be turned or an operating slider can be slid in order to push in the projection of each locking mechanism. It is also pointed out that in the buggy according to the invention the supporting pin, as such, can optionally be a hollow pin, such as a tubular member, where the projection then extends into the interior of the pin in the protruding position and is completely or partially accommodated in the inside wall of the pin in the retracted position. However, it is preferable to provide the projection on the outside of the supporting pin, so that this is also readily accessible to the user in order, for example, to test the operation of the locking mechanism completely separately from the child carrier. Furthermore, providing the projection on the outside of the supporting pin has the advantage that the pin slider can be accommodated in the interior of the supporting pin.

The buggy according to the invention also allows a child carrier, in which the child is already sitting, to be placed on the supporting pins straight away. Locking of the front wheel and rear wheel bars is then produced automatically or optionally after separate operation of a ring or slider.

According to an advantageous embodiment of the buggy according to the invention, when the projection is in the protruding position, the portion of the projection facing the free end of the supporting pin and located outside the supporting pin tapers in the direction of said free end of the supporting pin. Tapering of this portion of the supporting pin ensures reliable operation by means of a tubular member to be slid over the supporting pin. As a consequence of said tapering portion of the projection, the projection can then be pushed in gradually as said tubular member is slid further over it. However, tapering of said section of the supporting pin can also be advantageous when the projection is operated in another way.

According to a further advantageous embodiment of the buggy according to the invention the projection has a first end that is located outside the supporting pin in the protruding position and a second end where a tilt pin is provided, with respect to which the projection can tilt, and the side of the projection extending between the first and second end and facing away from the free end of the supporting pin is made convex. Such a convex construction facilitates running of this curved portion of the projection over the contact surface of the pin slider that faces the projection.

According to yet a further advantageous embodiment of the buggy according to the invention the first end of the pin slider in contact with the projection is chamfered in such a way that, viewed from the low side of the chamfering towards the high side of the chamfering, the chamfering runs in the direction of retraction of the projection. What can be achieved relatively easily in this way is that as the projection retracts further by pushing in the latter the pin slider is pushed further away from the projection, in particular away from the tilt pin thereof.

According to yet a further advantageous embodiment of the buggy the locking mechanism furthermore comprises a shaft slider that is provided in the respective coupling member and can be slid in the longitudinal direction of the pivot axis, wherein the second end of the pin slider makes contact with the shaft slider under the influence of the tensioning system and wherein the locking mechanism is equipped to slide the shaft slider via the pin slider from the release position thereof into the locked position during said pushing in of the projection. A shaft slider of this type makes it possible to couple the front wheel bar discs and the rear wheel bar discs to one another by means of an element that can be moved in the axial direction (hereinafter called 'axial' element), specifically the shaft slider or a part thereof. With such an 'axial' element the coupling is less susceptible to mutual misalignment of the discs to be coupled. Furthermore, such an 'axial' element easily enables the coupling forces to be distributed over a large surface area, so that the element can be subjected to much greater loading.

Furthermore, such an 'axial' element enables much easier installation in a housing, so that contamination of the actual coupling can be prevented. When a shaft slider is used the locking mechanism as a whole will be equipped, when the projection is pushed, against the pretensioning force, from the protruding position into the retracted position, to push the pin slider, against the pretensioning force, towards the pivot axis and by means of the pin slider to move the shaft slider, likewise against the pretensioning force, along the pivot axis from a release position of the shaft slider, corresponding to the protruding position of the projection, in which the wheel bar discs are able to turn relative to one another, into a locked position, corresponding to the retracted position of the projection, in which the wheel bar discs cannot be turned relative to one another.

With regard to the shaft slider in relation to the front wheel bar disc and the rear wheel bar disc it is pointed out that according to the invention it does not matter much whether the shaft slider is now brought into engagement with the rear wheel bar disc or with the front wheel bar disc for locking, at least assuming that, when locking, engagement on the other disc is also ensured in each case.

For corresponding reasons to those why it is advantageous that the end of the pin slider making contact with the projection is chamfered, according to yet a further embodiment of the buggy according to the invention it is advantageous if the second end of the pin slider making contact with the shaft slider has a contact surface that tapers in the direction of the pivot axis and faces the shaft slider.

According to yet a further advantageous embodiment of the buggy according to the invention, the shaft slider has an annular body, the shaft axis of which is coincident with the pivot axis. In this way a structurally simple whole that can be assembled in combination with the rear wheel bar disc and the front wheel bar disc is obtained. In this context it is furthermore advantageous according to the invention if the annular body of the shaft slider has a surface that is rotationally symmetrically tapering, in particular conically tapering, with respect to the pivot axis at the end facing the pin slider. What is achieved in this way is that the ability of the shaft slider to be operated by the pin slider is independent of the rotational position of the shaft slider with respect to the shaft axis. In addition, with this arrangement it is advantageous if the annular body has at least one locking pin at the end facing away from the pin slider, which locking pin, viewed in the locked position, protrudes into a locking recess in the respective rear wheel bar disc or the respective front wheel bar disc and, viewed in the release position, has been retracted from said locking recess. With a view to, on the one hand, reliable locking and, on the other hand, the possibility of locking in various positions, with this arrangement it is advantageous according to the invention if the shaft slider has a multiplicity of said locking pins which are arranged distributed in the peripheral direction of the annular body and is also provided with an at least corresponding multiplicity of said locking recesses.

In order to protect the locking pin or locking pins from damage or buckling, it is advantageous according to the invention if said respective front wheel bar disc or, alternatively, said respective rear wheel bar disc has a locking pin guide per locking pin through which in each case one locking pin can be slid back and forth.

In yet a further embodiment according to the invention, the tensioning system comprises a pretensioned spring, in particular a spring pretensioned by compression, which, at one end, engages on the shaft slider and, at the other end, engages on the respective coupling member, such as on the respective rear wheel bar disc or on the respective front wheel bar disc. Such a spring can be installed relatively easily and, because it acts on the shaft slider, specifically in the direction of the release position thereof, has the advantage that this spring then also has the effect of forcing the pin slider and the projection into the release position when the projection is not actuated.

According to yet a further advantageous embodiment of the buggy according to the invention, the buggy furthermore has a carrier for a child, such as a seat, which carrier is provided on either side with a support tube in which the supporting pins can be accommodated in such a manner that the projections are driven by the support tubes from the protruding position into the retracted position. In this way it is easy to ensure that the locking mechanisms are brought into the locked position merely by sliding the carrier for a child (also called child carrier here), or at least the support tubes thereof, over the supporting pins. In order to obtain locking of the locking mechanisms at the earliest possible stage when placing the child carrier on the frame, it is advantageous according to the invention if the projection is provided at the free end of the supporting pin in each case.

BRIEF DESCRIPTION OF THE DRAWINGS

The present invention will be explained in more detail below with reference to an illustrative embodiment shown diagrammatically in the drawing. In the drawing:

FIG. 3b shows a locked locking mechanism.

DETAILED DESCRIPTION OF THE INVENTION

Where reference is made below to FIG. 2 or 3, this refers to FIGS. 2a and/or 2b or FIGS. 3a and/or 3b, respectively.

Figure 1:
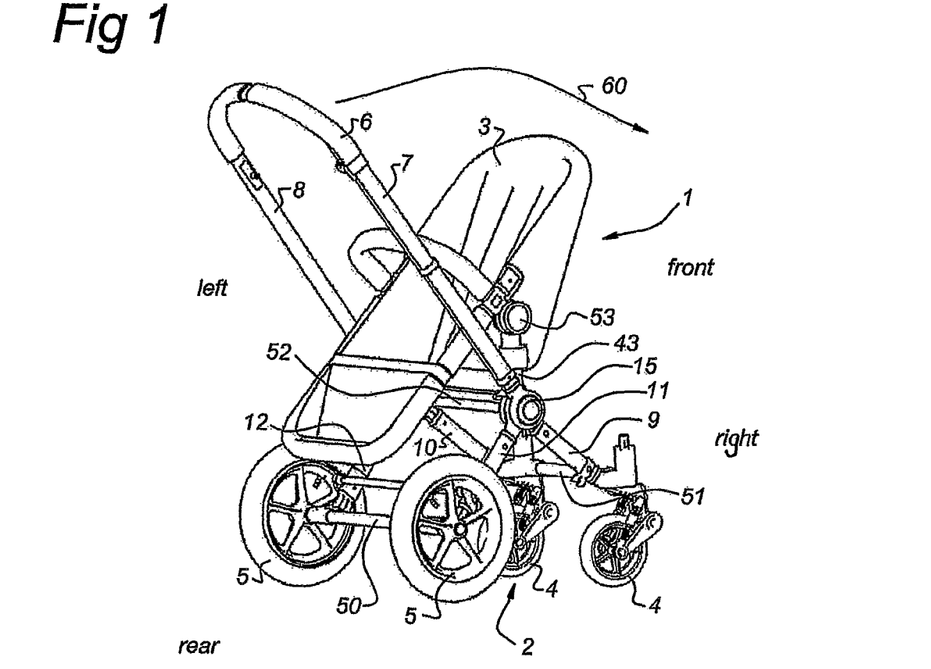
FIG. 1 shows a perspective, diagrammatic view of a buggy according to the invention, which, because components of the locking mechanism have not been made visible, equally shows a buggy according to the state of the art, for example a buggy as disclosed in WO 00/06437 or as marketed by the Applicant.

FIG. 1 shows a perspective complete view of a buggy according to the invention, although the locking mechanisms in the right-hand 15 and left-hand 16 coupling member cannot be seen.

The buggy 1 shown in FIG. 1 has a frame 2 on which a carrier, in this case a seat 3, for a child has been placed. However, the carrier could also be a carrycot. In this embodiment the frame has two swivel wheels 4 and two fixed wheels 5. The swivel wheels 4 are smaller than the fixed wheels 5. Assuming that in the representation shown in FIG. 1 the buggy 1 is pushed, here the wheels 4 will be referred to below as the front wheels and the wheels 5 as the rear wheels. However, it is pointed out that if the buggy shown in FIG. 1 is pulled, the wheels 5 can be regarded as front wheels and the wheels 4 as rear wheels. The same applies if the push/pull handle 6 is swung, as is indicated by the arrow 60, to the side of the wheels 4 and it is assumed that the buggy 1 is pushed. Incidentally, in the position where the push/pull handle 6 has been swung in accordance with arrow 60, the buggy 1 can also be pulled, in which case the wheels 4 will act as front wheels and the wheels 5 as rear wheels. However, as far as the terms front and rear and the terms right and left are concerned, hereinafter these will be based on the representation as shown in FIG. 1. The side of the buggy 1 facing the viewer at an angle is then the right-hand side and the side of the buggy 1 facing away from the viewer at an angle is then the left-hand side.

As stated, the frame 2 of the buggy 1 shown in FIG. 1 has a push/pull handle 6. This push/pull handle 6 has a right-hand push/pull bar 7 and a left-hand push/pull bar 8. The frame 2 furthermore has a right-hand front wheel bar 9 and a left-hand front wheel bar 10, which front wheel bars support the front wheels 4. The rear wheels 5 are supported on a right-hand rear wheel bar 11 and a left-hand rear wheel bar 12.

The right-hand push/pull bar 7, the right-hand front wheel bar 10 and the right-hand rear wheel bar 11 meet at a right-hand coupling member 15. The left-hand front wheel bar 10, the left-hand rear wheel bar 12 and the left-hand push/pull bar 8 meet at a left-hand coupling member 16.

To ensure that during use of the buggy the front wheel bars 9, 10 and rear wheel bars 11, 12 are and remain immobile with respect to one another and, on the other hand, to make it possible that these can move with respect to one another, for example to fold up the buggy or to put it into another use position, the right-hand and left-hand coupling member can each be locked in one or more positions in such a way that the right-hand front wheel bar and the right-hand rear wheel bar, and, respectively, the left-hand front wheel bar and the left-hand rear wheel bar are fixed relative to one another and can also be unlocked from these positions.

It can furthermore be seen in FIG. 1 that the frame 2 has a number of transverse bars 50, 51 and 52 for reinforcement. These transverse bars can optionally also be provided in other positions and one or more of the transverse bars can optionally also be dispensed with.

The seat 3 is fastened to the frame 2 by means of two support sleeves 43 (one of which is visible on the right-hand side in FIG. 1) on each side of the seat 3. For this purpose the frame 2 is provided at both coupling members 15, 16 with a supporting pin 13 and 14, respectively, which are not visible in FIG. 1 because the sleeves 3 have been slid over them. However, these supporting pins 13 and 14 can be seen significantly better in FIGS. 2, 3 and 4.

Figure 2A:
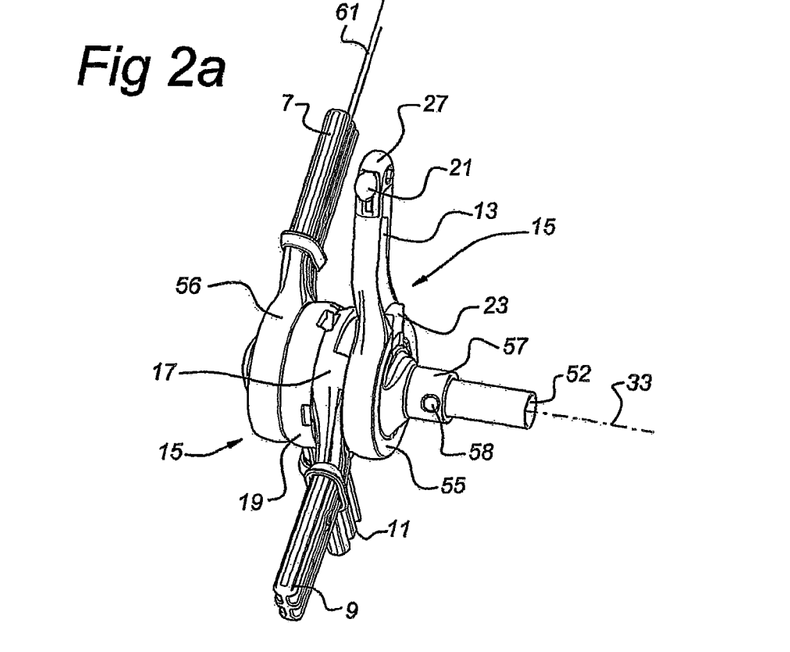
FIG. 2a shows a fully assembled right-hand coupling member with locking mechanism according to the invention and FIG. 2b shows an essentially identical left-hand coupling member, but with exploded components, where what is shown in FIGS. 2a and b constitutes a detail of the buggy as shown in FIG. 1.
Figure 2B:
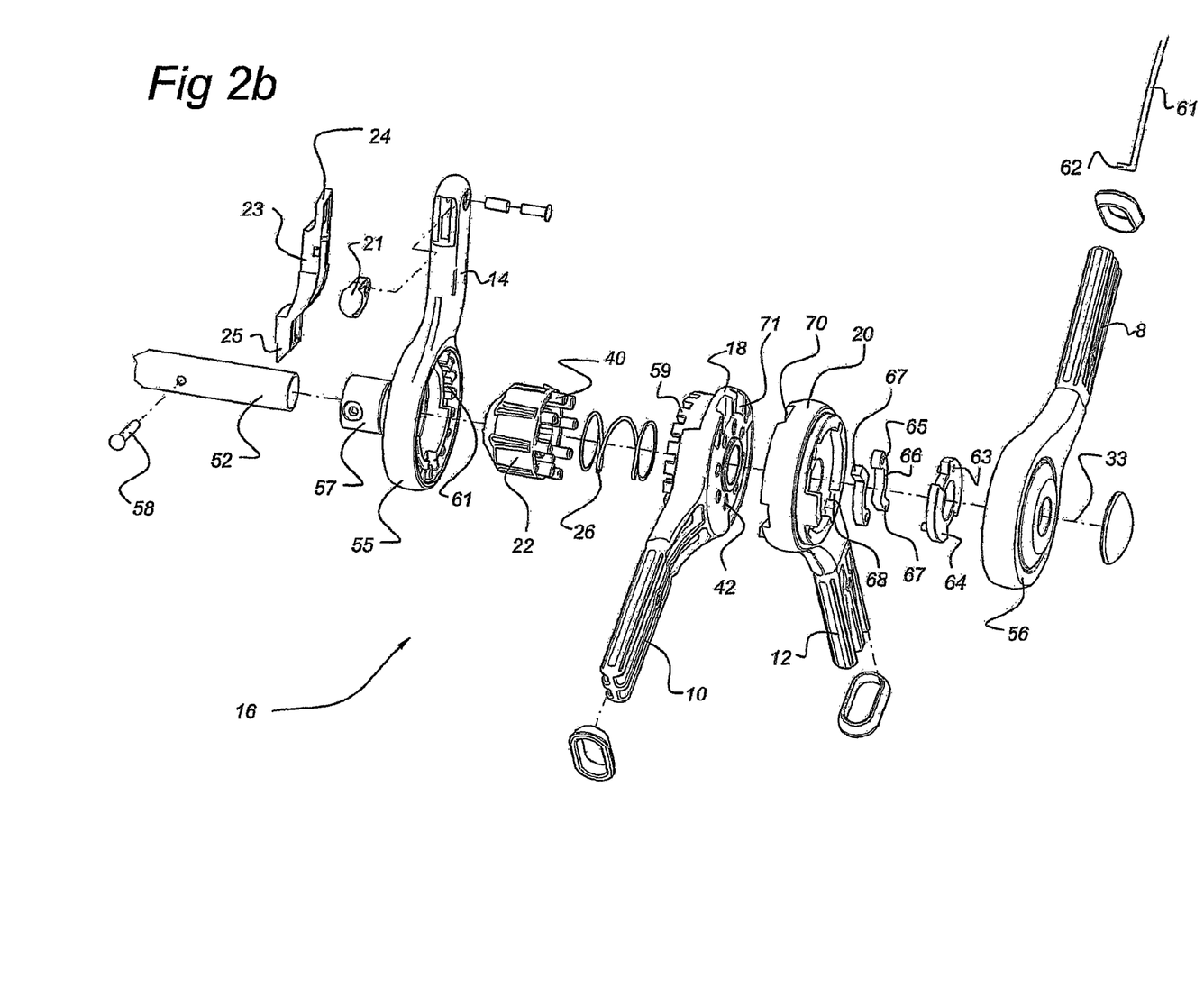
Figure 3A:
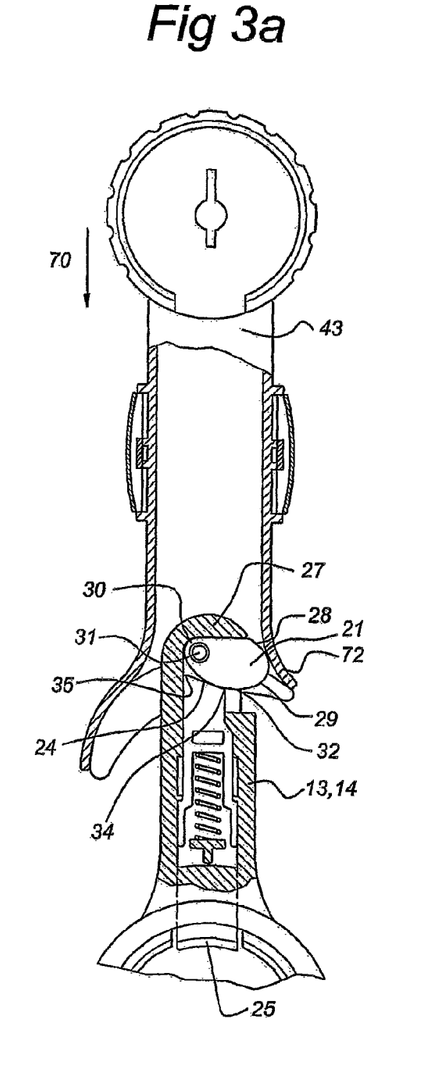
FIGS. 3a, 3b and 4 show, in cross-section and in longitudinal section, respectively, a coupling member with locking mechanism according to the invention for a buggy according to the invention, where FIG. 3a and FIG. 3b differ in that FIG. 3a shows an unlocked locking mechanism
Figure 3B:
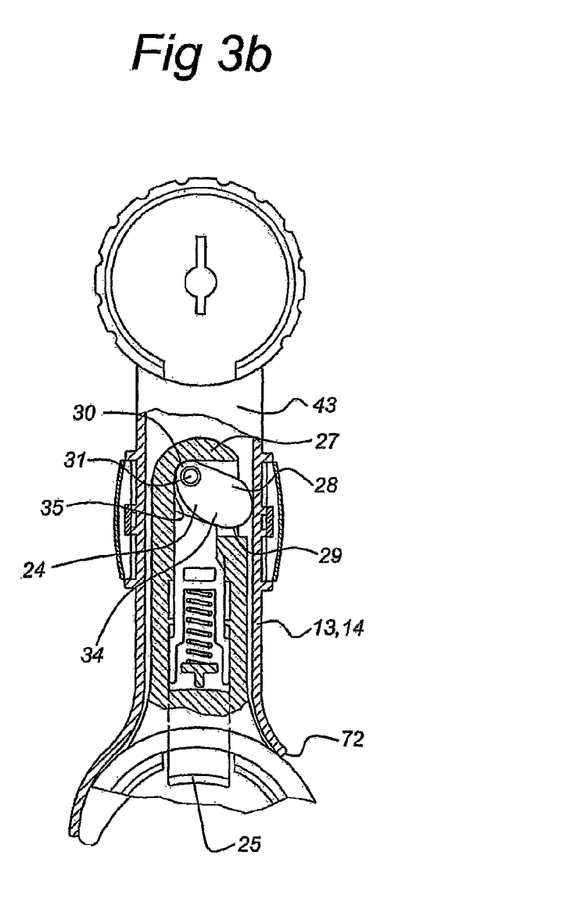

In FIGS. 2*a* and 2*b*, together also referred to as FIG. 2, a detail of the frame 2 from FIG. 1 is shown, which detail essentially comprises the transverse bar 52 with the coupling members 15, 16 on the two ends thereof. Furthermore, the ends of the push/pull bars 7, 8, located close to the coupling members 15 and 16, the front wheel bars 9 and 10 and rear wheel bars 11 and 12 are shown in FIGS. 2*a* and 2*b*. FIG. 2*a* shows the right-hand coupling member 15 and FIG. 2*b* shows the left-hand coupling member 16.

Figure 4:
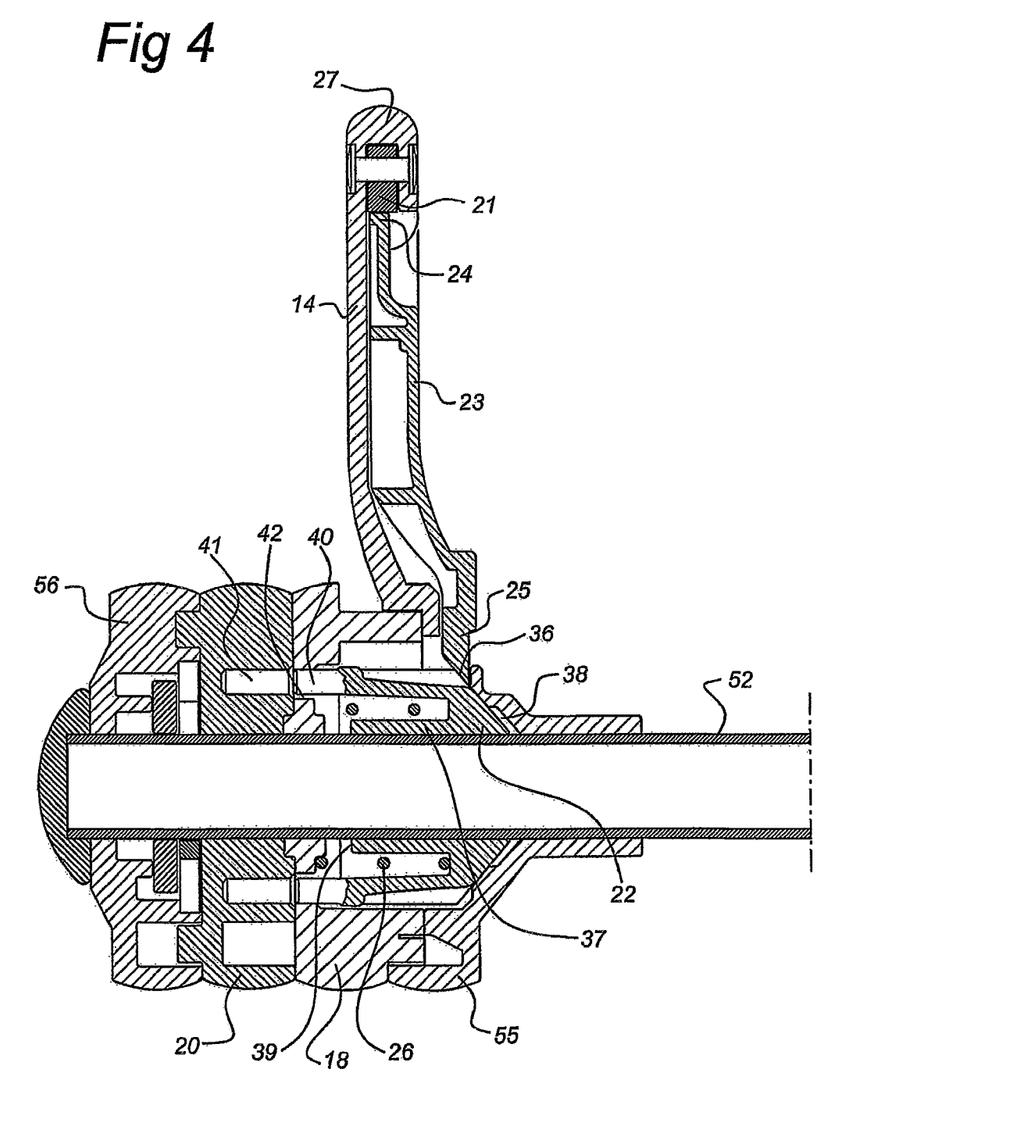

As can be seen in FIG. 2 and partly also in FIG. 4, the right-hand coupling member 15 has a right-hand front wheel bar disc 17 to which the right-hand front wheel bar 9 is fixed, as well as a right-hand rear wheel bar disc 19 to which the right-hand rear wheel bar 11 is fixed, and the left-hand coupling member has a left-hand front wheel bar disc 18 to which the left-hand front wheel bar 10 is fixed and a left-hand rear wheel bar disc 20 to which the left-hand rear wheel bar 12 is fixed. Furthermore, each coupling member 15, 16 has a supporting pin disc 55, to which the respective supporting pins 13 and 14 are fixed, as well as handle discs 56, via which the push/pull bars 7, 8 are fixed to each respective coupling member 15, 16. The four discs 17, 18, 19, 20, 55 and 56 of each coupling member 15 and 16 are mounted on a common shaft 52, which determines the pivot axis 33. The supporting pin discs 55 are fixed on the shaft 52 via a sleeve 57 and pin 58. However, in this context it must be pointed out that embodiments where none of the discs 17, 18, 19, 20, 55 and 56 are fixed with respect to the shaft 52 are also possible and are even provided by the Applicant.

As can furthermore be seen in FIG. 2, especially in the case of the right-hand coupling member 16 shown in exploded view, the supporting pin disc 55 is fixed with respect to the front wheel bar disc 18 (17) by means of engaging teeth 59 and ridges 61. However, it is pointed out that it is also readily possible to be able to turn the supporting pin disc 55 and front wheel bar disc 18 with respect to one another, where this ability to turn with respect to one another will then preferably be lockable and unlockable.

Furthermore, at each coupling member 15, 16 the handle discs 56 can be turned with respect to the respective rear wheel bar discs 19, 20 and can also be locked in at least two positions, preferably three or more positions. This releasable locking between the handle disc 56, on the one hand, and the respective rear wheel disc 19, 20, on the other hand, can, per se, be implemented in various ways. The way in which this locking is achieved is relatively independent of the present invention. One possible method for implementing such a locking system is illustrated in FIG. 2B. This locking system comprises an operating rod 61 that hooks with a hook 62 into a hole 63 in a disc 64. In this way the disc 64 can be turned by means of the operating rod 61. Two arms 66 provided with a protruding projection 67 are provided on the disc 64 such that they can rotate about an axis point 65 in each case. These projections 67 are located in guide slots (not visible) provided on the inside of disc 56 and by pulling operating rod 61 upwards are completely retracted into the guiding slot from a position in which they protrude radially from the guide slots. In the radially protruding position the projections can then engage in recesses 68 in the rear wheel bar disc 19 and 20, respectively, and thus prevent mutual rotation of the discs 56, on one side, and 19, 20, on the other side, whilst in the retracted position they are retracted from said recess 68. The push/pull handle 6 can thus be locked in various positions with respect to the rear wheel bars 11 and 12 by providing the recess 68 in suitable locations. In particular, with this arrangement as far as the locked positions are concerned, there will be the position shown in FIG. 1 as well as a second position indicated by means of arrow 60 in FIG. 1. In the second position the push/pull handle 6 has been turned through approximately 80-120 degrees with respect to the first position shown in FIG. 1. For a wheelbarrow position, as also described in WO 00/06437, it will optionally also be possible to lock the handle 6 in a third or even a fourth position. In such a third position the bars 7, 8 of the handle 6 will be in the extension of the rear wheel bars 11, 12 or in the extension of the front wheel bars 9, 10. The handle 6 can optionally also be brought into the extension of both the rear wheel bars 11, 12 and the front wheel bars 9, 10, in which case there can thus be four positions. Five positions or more are optionally also conceivable, for example in order to position the handle 6 higher or lower depending on the height of the user. Incidentally, it is pointed out that it is also readily conceivable that the wheelbarrow position, or optionally the wheelbarrow positions, can be achieved by making the handle 6 lockable in only two positions. In this case the position shown in FIG. 1 and the position of the handle indicated diagrammatically by 60 in FIG. 1 will preferably be approximately such that the handle is in the extension of the front wheel bars 9, 10 and the rear wheel bars 11, 12, respectively.

The locking mechanism for locking the front wheel bars and the rear wheel bars with respect to one another will be discussed specifically below. As already indicated, this locking mechanism is in particular provided both in the left-hand and in the right-hand coupling member. However, it will be clear to those skilled in the art that it is optionally conceivable to provide such a locking mechanism in only one of the coupling members and that this is also fully within the scope of the present invention, but that this could be associated with some instability in the frame because movement of the front and rear wheel bars relative to one another is then prevented on the one side of the frame whilst this is permitted on the other side. If, however, the buggy is also additionally provided with another locking system for locking the front wheel bars and the rear wheel bars, for example a system as disclosed in WO 00/06437 and the locking mechanism according to the invention is used solely to improve safety, such instability in the frame constitutes a less serious problem. Specifically, such instability will then easily be noticed and it will then be known that the main locking, such as, for example, that disclosed in WO 00/06437 is not functioning. However, in practice the locking mechanism according to the invention will be used on either side for reasons of reliability.

In the illustrative embodiment of the present invention shown the locking mechanism is essentially made up of three components, i.e. an operating member, the projection 21, a transfer member, i.e. the pin slider 23, and a locking member, i.e. the shaft slider 22, which in this illustrative embodiment will also be called locking slider. By constructing the locking slider 22 in such a way that this can be slid between a position in which this engages on both the front wheel bar disc 17, 18 and on the rear wheel bar disc 19, 20 and a position in which this does not engage on the two discs mentioned, but engages only on one of the discs mentioned or none of the discs mentioned, locking and unlocking, respectively, can be achieved. The fact that such engagement on both discs at once as well as on one or none of the two discs can be implemented in a large number of diverse ways will be immediately apparent to those skilled in the art. In contrast to what has been shown, the locking slider could, for example, be a key that can be slid back and forth.

A tensioning system 26 is provided in order to achieve pretensioning of the locking slider 22 in the direction of the release position thereof (that is to say the unlocked position). In the embodiment shown this tensioning system consists of a helical spring 26, which has been pretensioned by compression. In the embodiment shown in the assembled state this helical spring 26 is located partially in the interior of the locking slider 22 (see FIG. 4) so that one end engages on the locking slider 22. The other end of the helical spring 26 engages on the front wheel bar disc 18. The freedom of movement of the locking slider 22 is restricted, on one side, by the front wheel bar disc 18 and, on the other side, by the supporting pin disc 55. In the release position the locking slider 22 will make contact with the supporting pin disc 55.

In this context it will be immediately apparent to those skilled in the art that the locking slider 22 can then also be so constructed that when the front wheel bar disc 17, 18 and the rear wheel bar disc 19, 20 are locked, this at the same time locks the supporting pin disc 55 with respect to said front wheel bar and rear wheel bar discs, whilst in the release position it can be possible to turn the supporting pin disc 55 with respect to the front wheel bar disc 17, 18 and/or rear wheel bar disc 19, 20. This can be achieved, for example, by providing one or more ridges on the peripheral surface of the locking slider 22, which ridges, in the locked position, are accommodated in the radial recess made in the interior of the supporting pin disc 55 and, in the release position, are completely free in order to allow rotation of the supporting pin disc 55 with respect to the locking slider 22, where, furthermore, the locking slider 22 permanently engages, by means of at least one locking pin 40, in a locking pin hole 42 in the front wheel bar disc 17, 18.

In the embodiment shown the locking slider 22 is constructed as an essentially annular body 37 with, as stated, an accommodating cavity for the tensioning spring 26. At one end this annular body 37 is provided with a multiplicity of locking pins 40 arranged distributed around the periphery of the body 37 and at the other end this body 22 is provided with a conically tapering surface 38. A number of locking pin guides 42 corresponding to the number of locking pins 40 and in which the locking pins are located both in the release position and in the locked position have been made in the front wheel bar disc 18. In the case of the locked position, however, the locking pins 40 protrude from the front wheel bar disc 17, 18 on the side of the front wheel bar disc 17, 18 facing away from the locking slider 22, so as to engage in locking recesses 41, which have been made in the rear wheel bar disc 19, 20.

The locking slider 22 is actuated by chamfering 36 at the bottom end 25 of the pin slider 23 which engages on the conical end face 38 thereof. The locking slider 22 is pushed from the release position into the locked position by pushing the pin slider 23 transversely to the pivot axis 33 towards the pivot axis 33.

A projection 21 is provided for pushing the pin slider 23 towards the pivot axis 33. This projection 21 engages on the end 24 of the pin slider 23 facing away from the pivot axis 33. To facilitate the effect of the projection 21 on this end 24, the end 24 of the pin slider 23 is chamfered. This chamfering has a low side 34 and a high side 35 (see FIG. 3). The projection 21 is made convex on the side facing the pin slider 23. The effect of this convex shape 32 is to make the curved surface 32 run smoothly over the chamfering 34-35 when the projection 21 tilts about a tilt pin 31. The tilt pin 31 is provided at the end 30 located inside the supporting pin 13, 14. This end 30 of the projection 21 is opposite the end 29 of the projection. In the release position of the locking mechanism the end 29 of the projection is in a protruding position with respect to the supporting pin 13, 14. In the locked position this end 29 will preferably be completely retracted, optionally partially retracted, in the supporting pin 13, 14. The portion 28, facing the free end 27 of the supporting pin 13, 14, of the end 29 of the projection 21 that protrudes in the release position is made tapering in the direction of the free end 27 of the supporting pin 13, 14. This facilitates operation of the projection 21 by a sleeve 43 that is pushed in accordance with arrow 70 from the top onto the supporting pin 13, 14. The internal dimensions of the sleeve 43 will preferably correspond to the external dimensions of the supporting pin 13, 14 except for slight play.

What is achieved by now positioning the projection 21 at the top end of the supporting pin 13, 14 is that the locking mechanism is brought directly from the release position into the locked position as soon as sliding the sleeve 43 over the supporting pin 13, 14 is initiated.

It is pointed out that in the case of the embodiment of the buggy according to the invention shown in the figures the locking disclosed in WO 00/06437 can also be seen and has been used; see the cut-outs 70 and 71 in the rear wheel bar disc 20 and front wheel bar disc 21, respectively. When such cut-outs 70 and 71 are precisely opposite one another and a projection (see WO 00/06437, FIG. 4, reference numeral 16 for such a projection) is provided at the bottom of the sleeve 43, double locking can then be obtained in this way when the sleeve 43 has been slid fully over the supporting pins 13, 14. As already pointed out previously, this double locking is not necessary but is practical even if only to make it possible also to use child carriers, such as seats 3, which are already on the market for a buggy as disclosed in WO 00/06437, with the buggy frame according to the present invention.

The invention claimed is:

1. A buggy comprising a frame for accommodating a carrier for a child, wherein the frame comprises:
   front and rear wheels;
   a push and pull handle with a right-hand push/pull bar and a left-hand push/pull bar;
   a right-hand and a left-hand front wheel bar which supports said front wheels;
   a right-hand and a left-hand rear wheel bar which supports said rear wheels;
   a right-hand and a left-hand supporting pin for supporting the carrier;
   a right-hand coupling member, the right-hand coupling member comprising a right-hand front wheel bar disc, a right-hand rear wheel bar disc, a right-hand push/pull bar disc, and a right-hand supporting pin disc, wherein the right-hand front wheel bar is fixed to the right-hand coupling member via the right-hand front wheel bar disc, wherein the right-hand rear wheel bar is fixed to the right-hand coupling member via a right-hand rear wheel bar disc, wherein the right-hand push/pull bar is fixed to the right-hand coupling member via the right-hand push/pull bar disc, wherein the right-hand supporting pin is fixed to the right-hand coupling member via the right-hand supporting pin disc, and wherein the right-hand front wheel bar disc and the right-hand rear wheel bar disc are fixed in such a way that the right-hand front wheel bar disc and the right-hand rear wheel bar disc are turnable relative to one another about a pivot axis that runs essentially transversely to the front wheel bars, the rear wheel bars, the push/pull bars and the supporting pins; a left-hand coupling member, the left-hand coupling member comprising a left-hand front wheel bar disc, a left-hand rear wheel bar disc, a left-hand push/pull bar disc, and a left-hand supporting pin disc, wherein the left-hand front wheel bar is fixed to the left-hand coupling member via the left-hand front wheel bar disc, wherein the left-hand rear wheel bar is fixed to the left-hand coupling member via a left-hand rear wheel bar disc, wherein the left-hand push/pull bar is fixed to the left-hand coupling member via the left-hand push/pull bar disc, wherein the left-hand supporting pin is fixed to the left-hand coupling member via the left-hand supporting pin disc, and wherein the left-hand front wheel bar disc and the left-hand rear wheel bar disc are fixed in such a way that the left-hand front wheel bar disc and the left-hand rear wheel bar disc are turnable relative to one another about the pivot axis;
wherein the right-hand and left-hand coupling member are each lockable in one or more positions in which the right-hand front wheel bar and the right-hand rear wheel bar and the left-hand front wheel bar and the left-hand rear wheel bar, respectively, are fixed relative to one another, and are unlockable from the one or more positions,
wherein each respective coupling member has a locking mechanism provided on the frame, wherein each locking mechanism comprises:

a projection, provided on each respective supporting pin, wherein the projection is movable between a protruding position and a retracted position, when viewed from a direction parallel in alignment with the pivot axis;

a pin slider, provided in each respective supporting pin, the pin slider being slidable in the longitudinal direction of each respective supporting pin, the pin slider having a first end facing the projection and a second end facing the pivot axis;

a tensioning system equipped to pretension the pin slider and the projection such that, while the first end of the pin slider is in contact with the projection, the projection is subjected to a pretensioning force driving the projection in the direction of the protruding position;

wherein each locking mechanism is equipped to push the pin slider, against the pretensioning force, towards the pivot axis when the projection is pushed, against the pretensioning force, from the protruding position to the retracted position, such that the locking mechanism moves from a release position corresponding to the protruding position of the projection, in which the respective rear wheel bar disc and the respective front wheel bar disc are able to turn relative to one another, into a locked position corresponding to the retracted position of the projection, in which the respective rear wheel bar disc and the respective front wheel bar disc are not able to turn relative to one another.

2. The buggy according to claim 1, wherein the projection includes a tapered portion, wherein each supporting pin respectively includes a free end, wherein when the projection is in the protruding position the tapered portion is located outside each supporting pin and the tapered portion tapers in the direction of the free end.

3. The buggy according to claim 1, wherein the projection has a first end that is located outside each supporting pin in the protruding position and a second end where a tilt pin is provided, wherein the projection can be tilted with respect to the tilt pin, and wherein the side of the projection extending between the first and second end and facing away from the free end of each supporting pin is convex.

4. The buggy according to claim 1, wherein the first end of the pin slider in contact with the projection is chamfered wherein, viewed from the low side of the chamfering towards the high side of the chamfering, the chamfering runs in the direction of retraction of the projection.

5. The buggy according to claim 1, wherein each locking mechanism further comprises a shaft slider that is provided in each respective coupling member, wherein the shaft slider can be slid in the longitudinal direction of the pivot axis, wherein the second end of the pin slider makes contact with the shaft slider under the influence of the tensioning system and wherein each locking mechanism is respectively equipped to slide the shaft slider via the pin slider from a first position to a second position as the projection transitioned from the protruding position to the retracted position, wherein the first position corresponds to the release position of each locking mechanism, and wherein the second position corresponds to the locked position of each locking mechanism.

6. The buggy according to claim 5, wherein the second end of the pin slider includes a contact surface that tapers in the direction of the pivot axis, and wherein the contact surface faces and contacts the shaft slider.

7. The buggy according to claim 5, wherein the shaft slider has an annular body, wherein the pivot axis extends through the annular body of the shaft slider.

8. The buggy according to claim 7, wherein the annular body of the shaft slider has a surface that is rotationally symmetrically tapering with respect to the pivot axis at the end facing the pin slider.

9. The buggy according to claim 7, wherein the annular body has at least one locking pin at the end of the annular body of the shaft slider facing away from the pin slider, wherein the at least one locking pin, in the locked position of each locking mechanism, protrudes into at least one locking recess in each respective rear wheel bar disc or each respective front wheel bar disc, and wherein the at least one locking pin, in the release position, is retracted from the at least one locking recess.

10. The buggy according to claim 9, wherein the at least one locking pin comprises a plurality of locking pins arranged along the periphery of the annular body of the shaft slider facing away from the pin slider, wherein the at least one locking recess comprises a plurality of locking recesses corresponding to the plurality of locking pins.

11. The buggy according to claim 10, wherein said respective front wheel bar disc or said respective rear wheel bar disc has a locking pin guide per locking pin through which in each case one locking pin can be slid back and forth.

12. The buggy according to claim 5, wherein the tensioning system comprises a pretensioned spring which, at one end, engages on the shaft slider and, at the other end, engages the respective rear wheel bar disc or the respective front wheel bar disc.

13. The buggy according to claim 6, wherein the tensioning system comprises a pretensioned spring which, at one end, engages on the shaft slider and, at the other end, engages the respective rear wheel bar disc or the respective front wheel bar disc.

14. The buggy according to claim 7, wherein the tensioning system comprises a pretensioned spring which, at one end, engages on the shaft slider and, at the other end, engages the respective rear wheel bar disc or the respective front wheel bar disc.

15. The buggy according to claim 1, wherein the carrier is provided on either side with a support tube in which the supporting pins can be accommodated while the projections are driven by the support tubes from the protruding position into the retracted position.

16. The buggy according to claim 15, wherein each supporting pin respectively includes a free end, and wherein the projection is provided at the free end of each supporting pin.

* * * * *